United States Patent
Hou et al.

(10) Patent No.: US 9,467,823 B2
(45) Date of Patent: Oct. 11, 2016

(54) METHOD AND DEVICE FOR PROCESSING VALUE-ADDED SERVICE FOR SHORT MESSAGE SERVICE

(75) Inventors: Xiaolong Hou, Shenzhen (CN); Ning Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 844 days.

(21) Appl. No.: 12/557,652

(22) Filed: Sep. 11, 2009

(65) Prior Publication Data

US 2010/0069102 A1    Mar. 18, 2010

Related U.S. Application Data

(63) Continuation of application No. PCT/CN2008/070377, filed on Feb. 29, 2008.

(30) Foreign Application Priority Data

Mar. 12, 2007    (CN) .......................... 2007 1 0080098

(51) Int. Cl.
*H04W 4/12*    (2009.01)
*H04W 88/18*   (2009.01)

(52) U.S. Cl.
CPC ............. *H04W 4/12* (2013.01); *H04W 88/184* (2013.01)

(58) Field of Classification Search
CPC ......... H04W 4/12; H04W 4/14; H04W 4/18; H04W 4/185; H04W 88/184
USPC ....... 455/521, 456, 457, 466, 414, 412, 404, 455/415, 413, 417
See application file for complete search history.

(56) References Cited

U.S. PATENT DOCUMENTS

2003/0054844 A1    3/2003  Anvekar et al.
2004/0244102 A1*  12/2004  Benzon et al. ................... 4/420

(Continued)

FOREIGN PATENT DOCUMENTS

CN    1633096 A    6/2005
CN    1731865 A    2/2006

(Continued)

OTHER PUBLICATIONS

Short Message Peer-to-Peer Protocol Specification, Version 5.0 (Published Feb. 19, 2003).*

(Continued)

*Primary Examiner* — Nalini Mummalaneni
(74) *Attorney, Agent, or Firm* — Brinks Gilson & Lione

(57) ABSTRACT

The present invention discloses a value-added service for short message service, VAS-SMS, processing method and a VAS-SMS processing center, which include: the VAS-SMS processing center receives an original short message forwarded from the short message service center, generates a value-added service short message associated with the original short message in accordance with data of VAS-SMS subscribed by the calling and called parities of the original short message, submits the value-added service short message to the short message service center, and receives a delivery status report returned from the short message service center, and the value-added service for short message service processing center takes the delivery result of the value-added service short message as that of the associated original short message and sends a delivery result notification of the original short message to the short message service center.

19 Claims, 5 Drawing Sheets

(56) References Cited

U.S. PATENT DOCUMENTS

| | | | |
|---|---|---|---|
| 2006/0136560 A1* | 6/2006 | Jiang | 709/206 |
| 2007/0249374 A1* | 10/2007 | Hu et al. | 455/466 |
| 2008/0064424 A1* | 3/2008 | Greenwood et al. | 455/466 |

FOREIGN PATENT DOCUMENTS

| | | | |
|---|---|---|---|
| CN | 1889718 A | | 1/2007 |
| CN | 11889718 A | | 1/2007 |
| CN | 101026804 A | | 8/2007 |
| CN | 101031109 A | | 9/2007 |
| CN | 101179750 A | | 5/2008 |
| EP | 1 073 243 A1 | | 3/2001 |
| WO | WO 03/019959 A1 | | 3/2003 |
| WO | WO 2004/114693 A1 | | 12/2004 |
| WO | WO 2007/040310 A1 | | 4/2007 |
| WO | WO 2007040310 A1 | * | 4/2007 |
| WO | WO 2008085329 A1 | * | 7/2008 |

OTHER PUBLICATIONS

3G TS 23.039 V2.0.0 (Interface protocols for the connection of Short Message Service Centers' (SMSCs) to Short Message Entities (SMEs); Published Jun. 1999.*

Extended European Search Report issued in corresponding European Patent Application No. 08715113.0, mailed Sep. 24, 2010.

Written Opinion of the International Searching Authority issued in corresponding PCT Patent Application No. PCT/CN2008/070377, mailed Jun. 12, 2008.

Baojian, "The Design of Value Added Service Platform for Short Messaging Service" Dissertation—Hebei University of Technology, Jan. 2006.

Office Action issued in corresponding Chinese Patent Application No. 200710080098.6, mailed Feb. 23, 2012.

Yo, "900/1800 MHz TDMA Digital Cellular Mobile Telecommunication Network Protocol Specification for the Interface of Extended Short Message Entities (ESMEs) to Short Message Service Centres (SMSCs)" YD/T 1094-2000. Jan. 2, 2011-May 1, 2001.

Yo, "900/1800 MHz TDMA Digital Cellular Mobile Telecommunication Network Specification for Short Message Center Equipment, Part 1: Point to Point Short Message Service" YD/T 1039-2000, Jan. 28, 2000.

Yo, "900/1800MHz TDMA Digital Cellular Mobile Telecommunication Network Specification for Short Message Service Center Equipment, Part 1: Point to Point Short Message Service" YD/T 1039.1, 2005.

Office Action issued in corresponding Chinese Patent Application No. 200710080098.6, mailed Apr. 27, 2011.

Office Action issued in corresponding Chinese Patent Application No. 200710080098.6, mailed Nov. 3, 2011.

Office Action issued in corresponding European Patent Application No. 08715113.0, mailed Oct. 14, 2011.

Global System for Mobile Communications, "Digital Cellular Telecommunications System (Phase 2+); Technical Realization of the Short Message Service (SMS); Point-to-Point (PP)" (GSM 03.40 version 7.2.0 Release 1998). European Telecommunications Standards Institute. TS 100 901 V7.2.0, 15 pages, Jul. 1999 (See pp. 25-27 and 74-92).

Global System for Mobile Communications,3rd Generation Partnership Project; Technical Specification Group Core Network; Digital Cellular Telecommunications System (Phase 2+); Mobile Application Part (MAP) Specification (Release 8). 3GPP TS 09.02, V7.9.0, Jun. 2001 (See pp. 162-173 and 687-765).

$3^{rd}$ Generation Partnership Project, "Technical Specification Group Core Network and Terminals; Technical Realization of the Short Message Service (SMS)" (Release 6) 3GPP TS 23.040, V6.7.0, Mar. 2006 (See pp. 28-32 and 103-126).

3rd Generation Partnership Project, "Technical Specification Group Core Network and Terminals; Mobile Application Part (MAP) Specification" (Release 7) 3GPP TS 29.002 V7.6.0 (Dec. 2006) (See pp. 206-215 and 681-766).

GSM, "$3^{rd}$ Generation Partnership Project; Technical Specification Group Core Network and Terminals; Technical Realization of the Short Message Service (SMS)" (Release 6) 3GPP TS 23.040. V6.8.1, Oct. 2006.

GSM, "$3^{rd}$ Generation Partnership Project; Technical Specification Group Core Network and Terminals; Mobile Application Part (MAP) Specification" (Release 7) 3GPP TS 29.002. V7.6.0, Dec. 2006.

Chinese Patent No. 101267592, issued on Apr. 17, 2013, granted in corresponding Chinese Patent Application No. 200710080098.6, 1 page.

\* cited by examiner

METHOD AND DEVICE FOR PROCESSING VALUE-ADDED SERVICE FOR SHORT MESSAGE SERVICE

CROSS REFERENCE TO RELATED APPLICATIONS

This application is a continuation of International Patent Application No. PCT/CN2008/070377, filed on Feb. 29, 2008, which claims priority to Chinese Patent Application No. 200710080098.6, filed on Mar. 12, 2007, both of which are hereby incorporated by reference in their entireties.

FIELD OF THE INVENTION

The present invention relates to mobile communication services and in particular to method and device for processing value added service for short message service.

BACKGROUND OF THE INVENTION

Short Message Service (SMS) are a currently common data service in a mobile communication network, which has become a predominant communication manner except voices for the majority of mobile subscribers along with increasingly popular mobile phones and flourishing short message services, and a number of value-added services for SMS also have been developed, such as a Short Message Receipt service, a Short Message Filtering service, a Short Message Personal Signature service, etc.

Currently, a Short Message Service Center (SMSC) has to be adapted to each addition of a Value-added Service for SMS (VAS-SMS) so as to support the new value-added service, which may aggravate the burden over the short message service center and bring inconvenience of developing and maintaining the value-added service.

A solution has been currently proposed in which value-added services for SMS are processed centrally through an additional network entity such as a VAS-SMS processing center to lower a frequency of adapting the short message service center. The inventors have identified during making the invention that in such a solution or like, the additional network entity executes partial processing of value-added services for SMS, thus adding the flexibility of developing a new value-added service for SMS, but no complete mechanism has been provided to ensure control of a short message processing flow by the additional network entity.

SUMMARY OF THE INVENTION

Embodiments of the invention provide a VAS-SMS processing method and a VAS-SMS processing center which can improve a control mechanism between the VAS-SMS processing center and a short message service center.

An embodiment of the invention provides a method for processing value-added service for short message service (VAS-SMS), including:

receiving, by a VAS-SMS processing center, an original short message forwarded from a short message service center, which is submitted from a calling party to the short message service center;

generating, by the VAS-SMS processing center, a value-added service short message associated with the original short message in accordance with data of VAS-SMS subscribed by the calling and called parities of the original short message;

submitting, by the VAS-SMS processing center, the value-added short message to the short message service center, and receiving a delivery status report returned from the short message service center, which reports a delivery result about whether the value-added service short message is delivered with success; and taking, by the VAS-SMS processing center, the delivery result of the value-added service short message as that of the associated original short message, and sending a delivery result notification of the original short message to the short message service center.

An embodiment of the invention provides a VAS-SMS processing center including:

a first unit adapted to receive an original short message forwarded from a short message service center, which is submitted from a calling party to the short message service center;

a second unit adapted to generate a value-added service short message associated with the original short message in accordance with data of VAS-SMS subscribed by the calling and called parties of the original short message;

a third unit adapted to submit the value-added service short message to the short message service center and to receive a delivery status report returned from the short message service center, which reports a delivery result about whether the value-added service short message is delivered with success; and a fourth unit adapted to take the delivery result of the value-added service short message as that of the associated original short message and to send a delivery result notification of the original short message to the short message service center.

A device for processing value-added service includes a value-added service processing center adapted to receive an original message forwarded from a message service center, to generate a value-added service message associated with the original message in accordance with message value-added service data subscribed by the calling and called parties of the original message, to submit the value-added service message to the message service center, to receive a delivery status report returned from the message service center, to take a delivery result of the value-added service message as that of the associated original message and to send a delivery result notification of the original message to the message service center.

A message service center includes a means adapted to forward an original message submitted from a calling party to a value-added service processing center, to buffer the original message, to receive a value-added service message associated with the original message, which is sent from the value-added service processing center, to deliver the value-added service message, to return a delivery status report to the value-added service processing center, and to receive a delivery result notification of the original message, which is generated by the value-added service processing center in accordance with the delivery status report.

The embodiments of the invention improve the control mechanism between the short message value-added service processing center and the short message service center. With the control mechanism, when no value-added service short message is to be generated, the flow for sending the original short message can be ensured to proceed, while in a specific value-added service for which a value-added service short message is to be generated, the transition between the flow for sending the value-added service short message and the flow for sending the original short message can be ensured, thereby improving the control flow for implementing the short message value-added service through the short message value-added service processing center.

DETAILED DESCRIPTION OF THE INVENTION

For numerous value-added services for SMS, a value-added service short message is regenerated according to the data of value-added service (VAS) subscribed by a subscriber, and a service flow for an original short message submitted from the subscriber is replaced with a flow for sending the value-added service short message. The embodiments of the invention offer a control mechanism between a VAS-SMS processing center and an SMSC to ensure the transition between the replacing flow and the original flow, and descriptions will be given by way of an example regarding how to implement the existing various value-added service for SMS by the control mechanism according to the embodiments of the invention. The above technical idea can be applied to other message service such as a multimedia message service by those skilled in the art without any inventive effort. The invention will be described in details below with reference to the drawings and the embodiments by way of an example of processing a value-added service for SMS.

Figure 1:
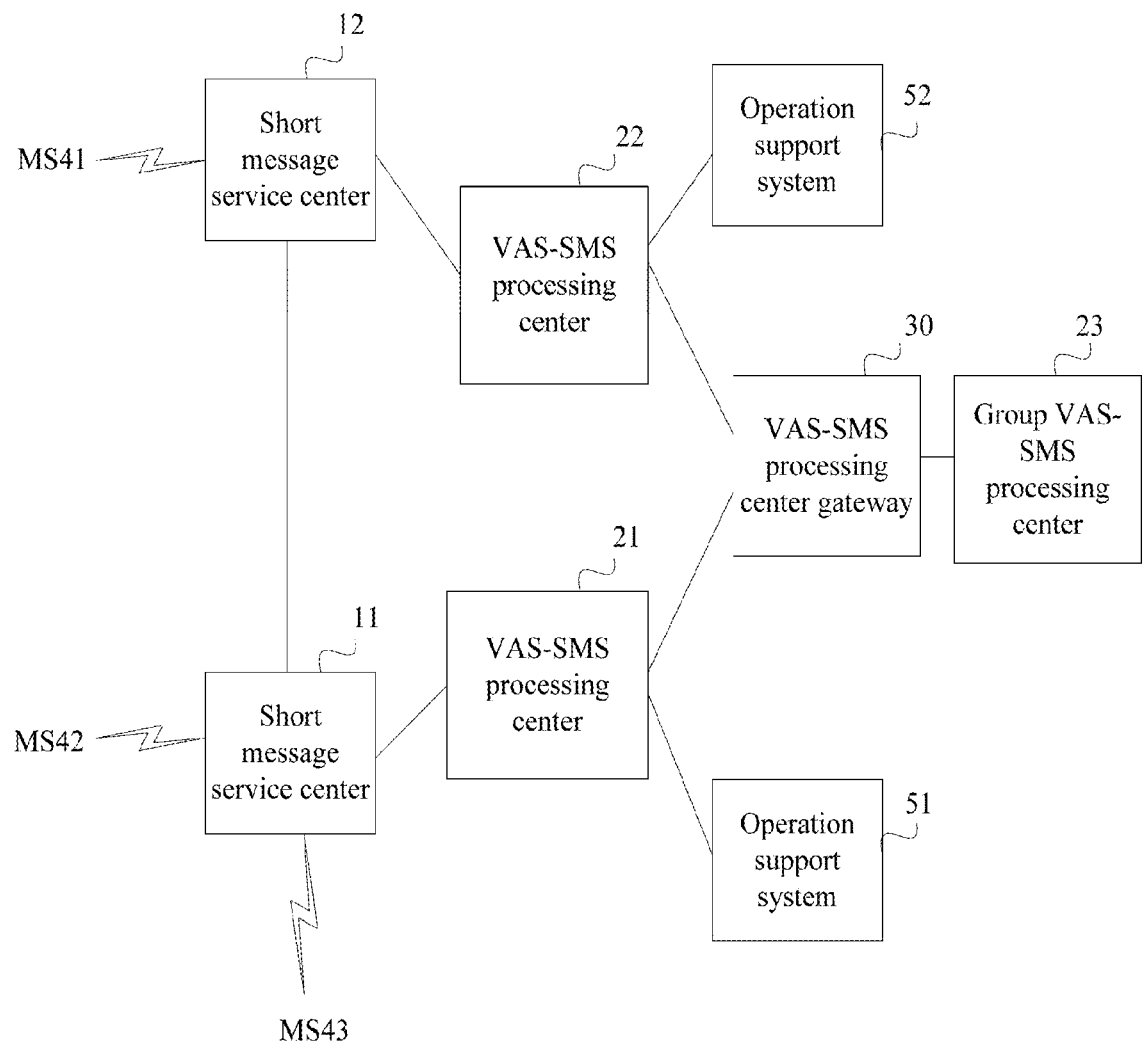
FIG. 1 is a schematic diagram of a system for implementing value-added service for SMS according to an embodiment of the invention.

As illustrated in FIG. 1, a system for processing value-added service for SMS according to an embodiment of the invention may include the following components.

At least one SMSC includes, for example, an SMSC 11, SMSC 12, etc., as illustrated in FIG. 1, which belong respectively to different areas.

At least one VAS-SMS processing center, for example, a VAS-SMS processing center 21, a VAS-SMS processing center 22, etc., as illustrated in FIG. 1.

Particularly, each VAS-SMS processing center is at least connected with one SMSC, and the data of VAS-SMS subscribed by a short message subscriber belonging to the SMSC is stored on the connected VAS-SMS processing center. As illustrated in FIG. 1, the data of VAS-SMS subscribed by a short message subscriber belonging to the SMSC 11 is stored on the VAS-SMS processing center 21.

The VAS-SMS processing centers may be arranged in a hierarchy, for example, of two levels as illustrated in FIG. 1, where a group VAS-SMS processing center 23 is arranged at a level 1 and each VAS-SMS processing center at level 2 may be connected with the group VAS-SMS processing center 23 through a VAS-SMS processing center gateway 30; and the group VAS-SMS processing center 23 is responsible for communication between the VAS-SMS processing centers at level 2 with use of stored routing information. In an embodiment, all the data of VAS-SMS subscribed by short message subscribers may alternatively be stored centrally on the group VAS-SMS processing center 23.

A mobile station (MS) is connected with an SMSC to which it belongs through a communication network, for example, an MS 41, an MS 42 and an MS 43 as illustrated in FIG. 1.

In an embodiment of the invention, the VAS-SMS processing center stores the VAS-SMS data of a subscriber of respective value-added services for SMS and processing the respective value-added services for SMS in accordance with the VAS-SMS data of the subscriber. For example, when the calling MS 42 submits to the SMSC 11 an original short message intended for the called MS 43, both the calling MS 42 and the called MS 43 belong to the SMSC 11, and the VAS-SMS processing center 21 to which the SMSC 11 is connected stores the data of the VAS-SMS subscribed by a subscriber of the calling MS 42 and a subscriber of the called MS 43, and thus a flow for processing this short message is as follows.

1. The SMSC 11 sends the original short message submitted from the subscriber to the VAS-SMS processing center 21 upon receiving the original short massage.

At this time, a flow for processing the original short message has not ended, and the SMSC 11 shall suspend processing of the original short message. A method to suspend processing of the original short message is to buffer all original short messages forwarded to the VAS-SMS processing center 21, and the buffered short messages wait for further processing.

2. The VAS-SMS processing center 21 obtains the VAS-SMS data of the calling MS 42 and the called MS 43 respectively and in accordance with the data of VAS-SMS subscribed by the calling and called parties, returns a reception acknowledgment indication to the SMSC 11 and generates if necessary a value-added service short message associated with the original short message.

Whether to generate the value-added service short message associated with the original short message is determined from the data of VAS-SMS subscribed by the calling and called parties. For example:

If neither of the calling and called parties subscribes for any VAS-SMS, then it is neither necessary for the VAS-SMS processing center 21 to process the original short message nor necessary to generate any value-added service short message. At this time, the SMSC 11 may be instructed in the reception acknowledgement indication to continue with the original flow, thereby delivering the original short message to the called party.

When the VAS-SMS data of the calling party shows that the calling party subscribes for a signature service, it is necessary to generate a value-added service short message associated with the original short message, where a signature set by the calling party is added in the value-added service short message; and/or When the VAS-SMS data of the calling party shows that the calling party subscribes for a calling number hiding service, it is necessary to generate a value-added service short message associated with the original short message, where a calling number in the value-added service short message is set as being null or modified to be specific identification information; and/or When the VAS-SMS data of the called party shows that the called party subscribes for a short message forwarding service, it is necessary to generate a value-added service short message associated with the original short message, where a called number in the value-added service short message is modified to be a forwarding-to number set by the called party.

There are numerous similar value-added services, and if a value-added service short message is to be generated, then the SMSC 11 may be instructed in the reception acknowledgement indication to continue with buffering the original short message.

3. The VAS-SMS processing center 21 submits the value-added service short message to the SMSC 11.

4. The SMSC 11 delivers the value-added service short message and in accordance with a delivery result, returns to the VAS-SMS processing center 21 a delivery status report which reports whether the value-added service short message is delivered with success.

5. The VAS-SMS processing center 21 takes the delivery result of the value-added service short message as that of the associated original short message and sends a delivery result notification of the original short message to the SMSC 11.

6. The SMSC 11 determines that the flow for processing the original short message may be ended upon receiving the delivery result notification of the original short message and deletes the buffered original short message.

To this end, the flow for delivering the value-added service short message has taken the place of the flow for processing original short message successfully.

Furthermore, when the VAS-SMS data of the calling party shows that the calling party subscribes for a Short Message Receipt service, the VAS-SMS processing center 21 may further instruct in the delivery result notification the SMSC 11 to send the delivery status report of the original short message to the calling party.

In the above step 2, if the VAS-SMS processing center 21 discovers from the VAS-SMS data of the called party that the calling party is set by the called party as a short message source to be filtered, the VAS-SMS processing center 21 firstly returns to the SMSC the reception acknowledgement indication of continuing with buffering and then sends directly to the SMSC the delivery result notification that the original short message is delivered with success.

In the above step 2, when the VAS-SMS data of the calling party shows that the calling party subscribes for a short message storage service, the VAS-SMS processing center 21 instructs the SMSC to store the original short message by categories for the calling party in accordance with the delivery result of the original short message. Further, when the VAS-SMS data of the called party shows that the called party subscribes for a short message storage service, the VAS-SMS processing center 21 instructs the SMSC to store the original short message by categories for the called party, in accordance with the delivery result of the original short message.

Another method in which the SMSC suspends processing of the original short message may include setting an associated processing suspension flag for each received original short message in step 1 and deleting the associated processing suspension flag upon receiving the delivery result notification of the original short message in step 6. In this method, each time receiving an original short message, the VAS-SMS processing center 21 instructs in the returned reception acknowledgement indication the SMSC to continue with suspending processing of the original short message; and upon determining from the data of VAS-SMS subscribed by the calling and called parties of the original short message that no new value-added service short message need to be generated, the VAS-SMS processing center 21 may send the original short message as the associated value-added service short message to the SMSC, thereby also implementing conveniently control on the various value-added services for SMS.

Each VAS-SMS processing center 21 is further connected with a Business and Operation Support System (BOSS) in the present area, being responsible for maintaining and updating the value-added service data of the subscriber stored on the VAS-SMS processing center 21. For example, a BOSS 51 and a BOSS 52 illustrated in FIG. 1 send the received value-added service data of a new subscriber or value-added service data updated by an existing subscriber respectively to the VAS-SMS processing center 21 for storage and also send a subscription cancelling indication of a subscriber to the VAS-SMS processing center 21 when the subscriber cancels subscription, and the VAS-SMS processing center 21 deletes relevant data of that subscription cancelling subscriber.

A preferably embodiment of the invention may be as follows.

The VAS-SMS processing center instructs the SMSC to set the value-added service identifier for the new subscriber and to delete the value-added service identifier of the unsubscription subscriber.

Before forwarding the original short message to the VAS-SMS processing center, the SMSC firstly determines whether the calling party (e.g., calling-party-belonging in a GSM system) or the called party (e.g., called-party-belonging in a CDMA system) is provided with the corresponding value-added service identifier, and if the calling party or the called party is provided with the corresponding value-added service identifier, the SMSC forwards the original short message to the VAS-SMS processing center for processing of the value-added service; and if the calling party or the called party is not provided with the corresponding value-added service identifier, the SMSC delivers the original short message to the called party.

Still referring to FIG. 1, if the calling and called parties of the short message belong to different SMSCs respectively, e.g., MS 41 and MS 42, the VAS-SMS processing center 21 or the VAS-SMS processing center 22 for processing the short message value-added service may obtain locally the value-added service data of one of the parties and then obtain the value-added service data of the other party from the VAS-SMS processing center to which the other party belongs through the group VAS-SMS processing center 23.

Of course, if the short message is forwarded, the value-added service data of a forwarding-to party is also to be obtained from a VAS-SMS processing center to which the forwarding-to party belongs. In the case that the short message is forwarded between more than two subscribers, the set forwarding-to parties are to be searched gradually to determine a final forwarding-to party.

The control mechanism according to an embodiment of the invention may further control a short message forwarding service for which a trigger condition is set. For example, when the called party sets a service condition of forwarding upon power-off, the forwarding service will not be triggered until the short message is delivered, and the VAS-SMS processing center may firstly instruct to deliver the original short message while needing to report a delivery status and an error code of the original short message. If the original short message is sent with failure due to power-off of the called party, a value-added service short message is generated according to a set forwarding-to party, thereby executing the short message forwarding service conditionally.

As can be seen from the above, with the control mechanism according to the embodiments of the invention, the existing various value-added services for SMS for the calling and called parties, e.g., the value-added services such as short message short message forwarding, filtering, signature, storage, etc., can be implemented by the separately arranged VAS-SMS processing center, and will not be described in details one by one. Those skilled in the art can take full advantage of the inventive solution in the various value-added services in various protocols.

Detailed descriptions will be given in further embodiments.

Figure 2:
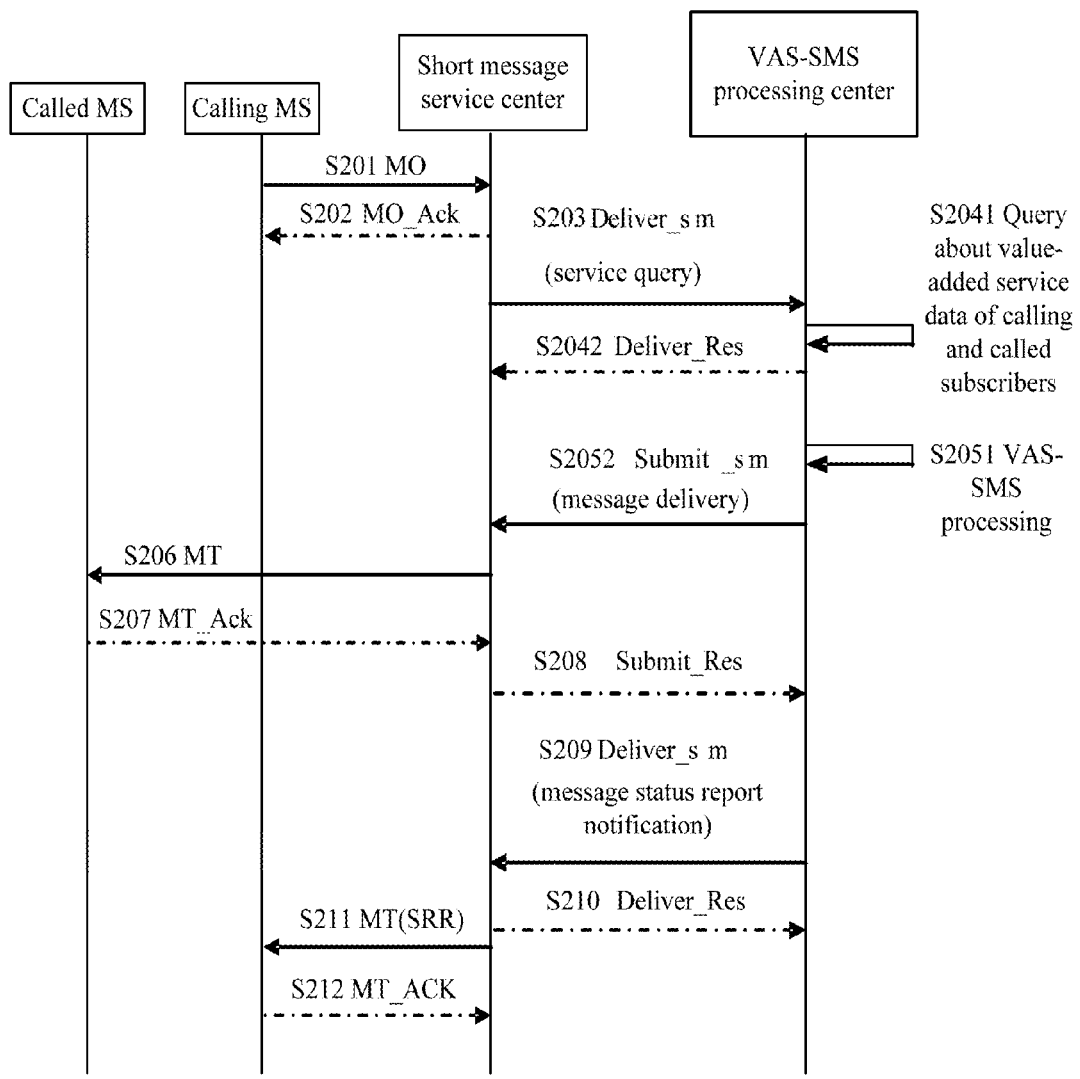
FIG. 2 is a schematic flowchart of a method for processing value-added service for SMS according to an embodiment of the invention.

As illustrated in FIG. 2, in a Global System for Mobile (GSM) communication mobile communication network, when calling and called parities of a short message belong to the same SMSC, a specific flow for implementing a value-added service for short message includes the following steps.

In step S201, the calling MS submits to the SMSC to which the calling party belongs an original short message intended for the called MS (MO).

In step S202, the SMSC to which the calling party belongs sends back a response to the calling MS (MO_Ack).

In step S203, the SMSC buffers and forwards the original short message to the local VAS-SMS processing center, where the short message may be forwarded by being carried in a service query message (Deliver_sm).

In a preferable flow, the SMSC to which the calling party belongs firstly determines whether a value-added service identifier is provided for the calling party, and if a value-added service identifier is provided for the calling party, then the SMSC forwards the original short message to the local VAS-SMS processing center; and if a value-added service identifier is not provided for the calling party, the SMSC delivers the original short message directly to the called party.

In step 2041, the VAS-SMS processing center checks the original short message submitted from the calling party and obtains value-added service subscription data of the calling and called parties respectively.

In step S2042, the VAS-SMS processing center sends a service query response message (Deliver_Res) to the SMSC to which the calling party belongs.

Deliver_Res contains a reception acknowledgement indication, for example:

If neither of the calling and called parties subscribes for any short message value-added service, then the SMSC is instructed in the Deliver_Res to process the original short message in a normal flow, and the SMSC delivers the buffered original short message to the called party and executes operations of charging, generating a bill, etc.

If the called party subscribes for a junk short message filtering service and the calling party is set as an object to be filtered out but the calling party subscribes for a receipt service, then the SMSC is instructed in the Deliver_Res to continue with buffering the original short message until the buffered original short message is deleted upon receiving a delivery status notification of the original short message in step S209 to end the flow of processing the original short message.

In step S2051, for some value-added services for SMS, the local VAS-SMS processing center executes corresponding service processing on the short message.

For example, if the called party subscribes for a short message forwarding service, the SMSC is instructed in the Deliver_Res to continue with buffering the original short message and to delete the buffered original short message after delivering a value-added service short message and receiving the delivery status notification of the original short message in the step S209.

If the calling party subscribes for a calling number hiding service, a calling number of the processed short message is set as being null or a specific identifier, etc.

In step S2052, the local VAS-SMS processing center delivers the value-added service short message to the SMSC by carrying it in Submit_sm.

In step S206, the SMSC delivers the value-added service short message to the called MS (MT).

In step S207, the called MS returns a delivery message response (MT_Ack).

In step S208, the SMSC returns a delivery status report to the VAS-SMS processing center in accordance with a delivery result of the value-added service short message, where the delivery status report is sent to the VAS-SMS processing center by being carried in a Submit_Res response message to report whether the value-added service short message is delivered with success.

In accordance with the received delivery status report, if the value-added service short message is sent with failure, then in accordance with the control of the VAS-SMS processing center, steps S2052-S208 are attempted repeatedly to improve a delivery success ratio of the value-added service short message as much as possible. Of course, a first threshold number of times can be set as a total number of times for the attempt, so that if the value-added service short message is delivered with failure, the VAS-SMS processing center repeats the submission of the value-added service short message to the SMSC for delivery within the first threshold number of times. The following two modes can be adopted.

Synchronous mode: The SMSC returns a delivery status report to the VAS-SMS processing center in accordance with a delivery result each time delivering the value-added service short message.

Asynchronous mode: For each received value-added service short message, if the message is sent with failure, the SMSC repeats the sending of the value-added service short message within a second threshold number of times and returns a delivery status report to the VAS-SMS processing center in accordance with a final delivery result.

In step S209, the VAS-SMS processing center takes the delivery result of the value-added service short message as that of the associated original short message and notifies by a Deliver_sm message the SMSC about the delivery result of the original short message.

The Deliver_sm message may further carry a notification about charging by the SMSC for the original short message.

If the calling party subscribes for a receipt service, the Deliver_sm message may further carry information to instruct the SMSC to send a delivery status report of the original short message to the calling party.

In step S210, the SMSC deletes the buffered original short message upon receiving the delivery status notification of the original short message, thereby finishing processing of the original short message, and returns a message response Deliver_Res to the VAS-SMS processing center.

In step S211, if the calling party requires a status report, then the SMSC generates and sends a status report message to the calling MS (MT(SRR)).

In step S212, the calling MS returns a message response (MT_ACK) upon receiving the status report message.

Figure 3:
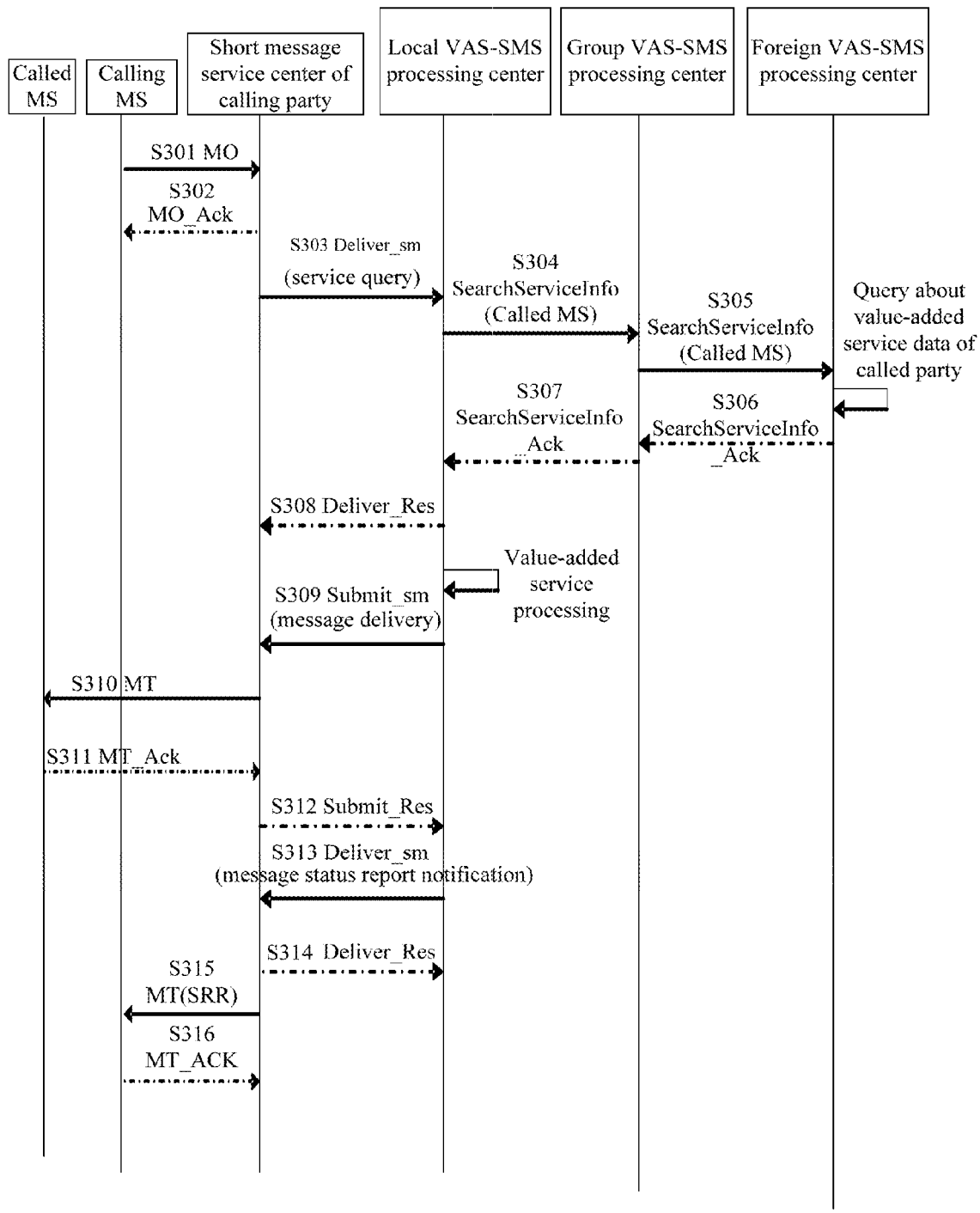
FIG. 3 is a schematic flowchart of a method for processing value-added service for SMS according to another embodiment of the invention.

As illustrated in FIG. 3, a flow for processing a value-added service for SMS includes the following steps when calling and called parties do not belong to the same SMSC.

In step S301, the calling party submits an original message to the SMSC to which the calling party belongs.

In step S302, the SMSC to which the calling party belongs sends back a response to the calling party.

In step S303, the SMSC forwards the original short message to the local VAS-SMS processing center.

The local VAS-SMS processing center checks the original message submitted from the calling party and obtains locally value-added service data subscribed by the calling party.

In steps 304-S307, the local short message value-added service processing center obtains the data of value-added service subscribed by the called party from a foreign VAS-SMS processing center of the called party through the group VAS-SMS processing center by interaction with use of Search Service Info and Search Service_Ack messages.

In step S308, the local VAS-SMS processing center sends a service query response message (Deliver_Res) to the SMSC to which the calling party belongs, Deliver_Res containing a reception acknowledgement indication.

The subsequent steps S309-S316 are the similar as those in the flow illustrated in FIG. 2 and descriptions thereof will not be repeated here.

Figure 4:
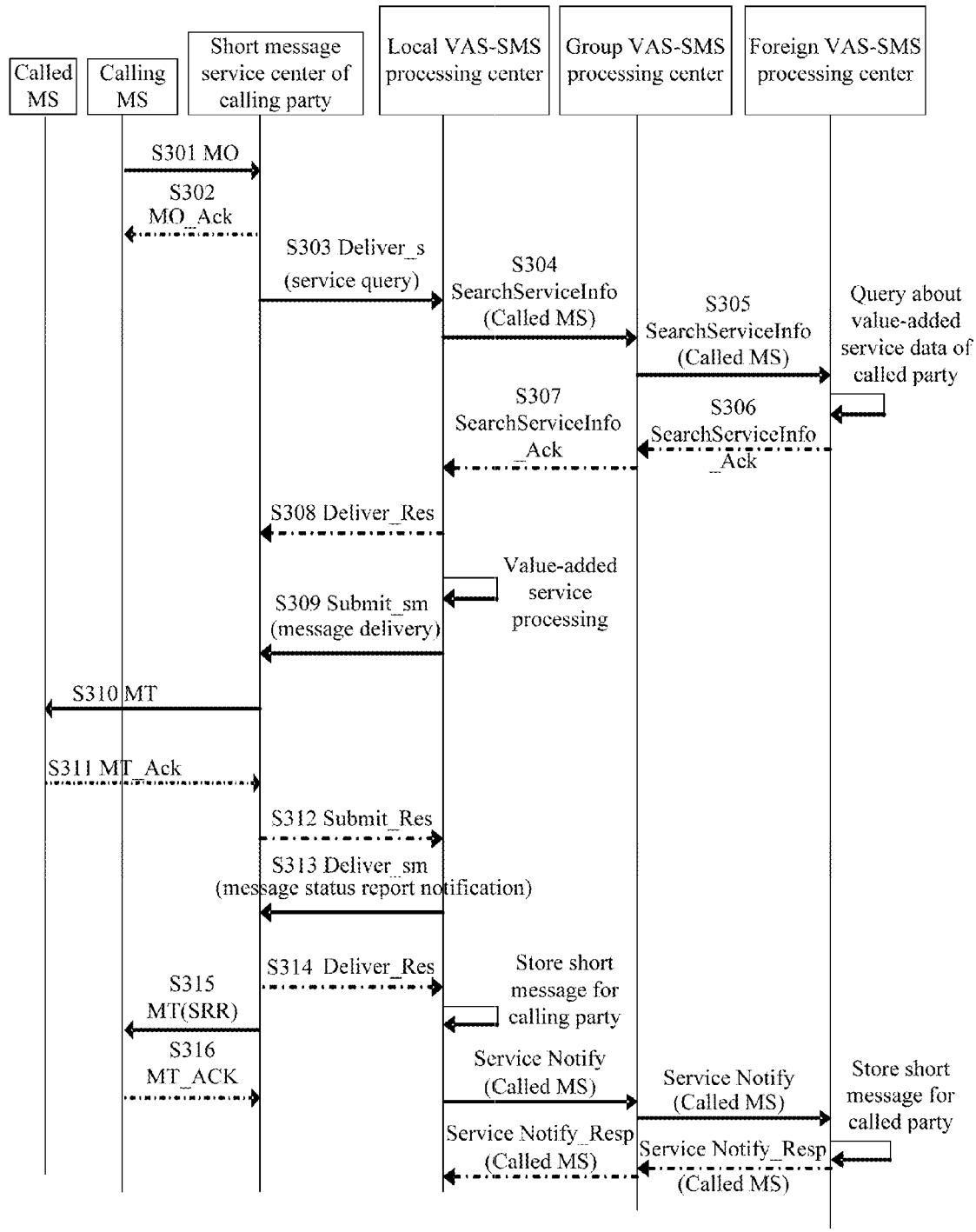
FIG. 4 is a schematic flowchart of a method for processing value-added service for SMS according to another embodiment of the invention.

As illustrated in FIG. 4, steps S301-S314 are the similar as in the flow illustrated in FIG. 3, and after step S314, if the calling party subscribes for a short message storage service, then the local VAS-SMS processing center stores for the calling party the short message sent from the calling party.

If the called party also subscribes for the short message storage service, the local VAS-SMS processing center also forwards the short message with a Service Notify message to the foreign VAS-SMS processing center, and the foreign VAS-SMS processing center stores the received short message for the called party and then returns a Service Notify_Ack response to the local VAS-SMS processing center. The Service Notify message and the Service Notify_Ack are merely a message definition, but the embodiments of the invention will not be limited thereto.

The short message storage service is also referred to as a data box service, and a short message subscriber may choose to store a sent and/or received short message and further choose to store a short message sent to and/or received from a specific object, and the VAS-SMS processing center can execute corresponding service control in accordance with subscription data of the subscriber.

The value-added service data of a subscriber of VAS-SMS may be stored centrally in the group VAS-SMS processing center, and the processing flow is slightly different in a way that the local VAS-SMS processing center of the calling party obtains the value-added service data of the subscriber from the group VAS-SMS processing center, and the other steps are similar and will not be described again.

With the above control mechanism, if no value-added service short message is to be generated, the flow for delivering the original short message can be ensured to proceed, while in a specific value-added service for which a value-added service short message is to be generated, the transition between the flow for sending the value-added service short message and the flow for delivering the original short message can be ensured, thereby improving the control flow for implementing the short message value-added service through the VAS-SMS processing center.

Figure 5:
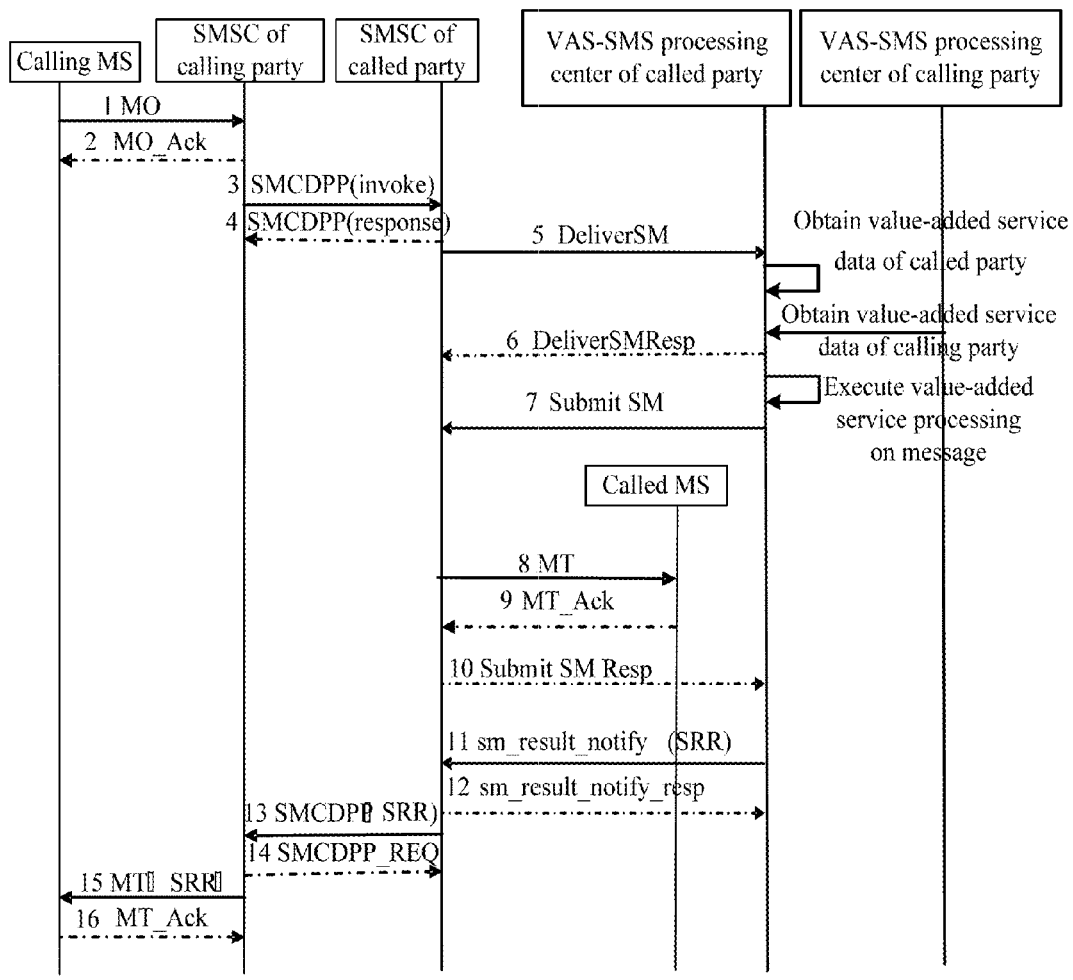
FIG. 5 is a schematic flowchart of a method for processing value-added service for SMS according to another embodiment of the invention.

In a Code Division Multiple Access (CDMA) system, the SMSC is in a called-party-belonging mode. There is a minor service implementation difference from the SMSC in a GSM system. As illustrated in FIG. 5, processing of a value-added service for SMS will be executed at the VAS-SMS processing center of the called party.

A general flow is described as follows.

In step 1, the calling party submits an original message to the SMSC to which the calling party belongs.

In step 2, the SMSC to which the calling party belongs sends back a response to the calling party.

In step 3, the SMSC to which the calling party belongs determines that the called party is a foreign user and then forwards the original short message to the SMSC to which the called party belongs by carrying the original short message in an SMCDPP (invoke).

In step 4, the SMSC to which the called party belongs returns a message response SMCDPP (response).

In step 5, the SMSC to which the called party belongs buffers and forwards the original short message to the VAS-SMS processing center of the called party.

In step 6, the VAS-SMS processing center of the called party checks the original short message.

The value-added service data of the called party is obtained from locally stored data and the value-added service data of the calling party is obtained from the VAS-SMS processing center of the calling party.

In step 7, the VAS-SMS processing center of the called party returns a response to the SMSC to which the called party belongs.

If neither of the calling and called parties orders any value-added service for SMS, the SMSC is instructed to process the original message in a normal flow and the SMSC delivers the message and returns a status report.

In step 8, if value-added service processing is to be executed on the original short message, the VAS-SMS processing center of the called party will also execute the step 6 and returns a processed value-added service short message to the SMSC to which the called party belongs.

In the remaining steps 9-16, between the VAS-SMS processing center of the called party and the SMSC to which the called party belongs, the delivery of the value-added service short message is performed and the flow for delivering the original short message is ended with the control mechanism according to the embodiments of the invention, and a specific flow thereof are the same as those in the third and fourth embodiments and will not be repeated again.

It shall be noted that those ordinarily skilled in the art can appreciate that all or part of the steps in the methods according to the embodiment can be implemented by a program instructing relevant hardware. The program may be stored in a computer readable storage medium, e.g., an ROM/RAM, a magnetic disk, an optical disk, etc.

Figure 6:
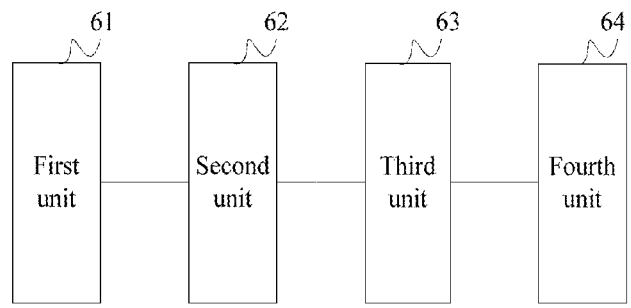
FIG. 6 is a schematic diagram of a VAS-SMS processing center according to an embodiment of the invention.

As illustrated in FIG. 6, a short message value-added service processing center according to an embodiment of the invention includes the following units.

A first unit 61 is adapted to receive an original short message forwarded from the SMSC, which is submitted from the calling party to the SMSC.

A second unit 62 is adapted to generate a value-added service short message associated with the original short message in accordance with data of VAS-SMS subscribed by the calling and called parties of the original short message and to return a reception acknowledgement indication to the SMSC in accordance with the data of VAS-SMS subscribed by the calling and called parties of the original short message.

A third unit 63 is adapted to submit the value-added service short message to the SMSC and to receive a delivery status report returned from the SMSC, which reports a delivery result about whether the value-added service short message is delivered with success.

A fourth unit 64 is adapted to take the delivery result of the value-added service short message as that of the associated original short message and to send a delivery result notification of the original short message to the short message service center.

Evidently, those skilled in the art can modify and vary the invention without departing from the spirit and scope of the invention. Accordingly, the invention is intended to encompass these modifications and variations of the invention provided that they come into the scope of the claims appended to the invention and their equivalents.

The invention claimed is:

1. A method for processing value-added service for short message service, VAS-SMS, comprising:
    setting by a Short Message Service Center (SMSC), a value-added service identifier to identify a new subscriber which has been subscribed to VAS-SMS, in the SMSC;
    receiving by the SMSC, an original short message submitted by a calling party to a called party;
    based on value-added service identifiers for subscribers in the SMSC, determining by the SMSC, whether at least one of the calling party or the called party of the original short message is provided with the value-added service identifier;
    if it is determined that the at least one of the calling party or the called party is provided with the value-added service identifier:
        forwarding by the SMSC, the original short message to a VAS-SMS processing center;
        obtaining by the VAS-SMS processing center, value-added service subscription data of the calling party or the called party; wherein:
            based on the obtained value-added service subscription data:
            generating by the VAS-SMS processing center, a value-added service short message associated with the original short message;
        submitting by the VAS-SMS processing center, the value-added service short message to the SMSC;
        delivering by the SMSC, the value-added service short message to a mobile station of the called party;
        receiving by the SMSC, a delivery message response submitted by the called party;
        based on the received delivery message response, the SMSC submitting a delivery status report to the VAS-SMS processing center to report a delivery result about whether the value-added service short message is delivered with success; and
    receiving by the VAS-SMS processing center, the delivery result of the value-added service short message as that of the associated original short message, and sending a delivery result notification of the original short message to the short message service center.

2. The method according to claim 1, further comprising:
    returning, by the VAS-SMS processing center, a receipt acknowledgement indication to the short message service center, in accordance with the value-added service subscription data of the calling party or the called party.

3. The method according to claim 1, wherein if the VAS-SMS processing center determines that the value-added service short message is delivered with failure in accordance with the delivery status report, the VAS-SMS processing center repeats the submission of the value-added service short message to the short message service center for delivery within a first threshold number of times.

4. The method according to claim 3, wherein the short message service center returns the delivery status report to the VAS-SMS processing center in accordance with the delivery result each time after delivering the value-added service short message.

5. The method according to claim 3, wherein if the short message service center sends the value-added service short message with failure, the short message service center repeats the submission of the value-added service short service message within a second threshold number of times, and returns the delivery status report to the VAS-SMS processing center in accordance with the final delivery result.

6. The method according to claim 2, further comprising: buffering, by the short message service center, each received original short message, and deleting the buffered original short message upon receiving the delivery result notification of the original short message, wherein the buffered short message is suspended from processing.

7. The method according to claim 2, further comprising: setting, by the short message service center, an associated processing suspension flag for each received original short message, and deleting the associated processing suspending flag upon receiving the delivery result notification of the original short message.

8. The method according to claim 2, wherein when data of VAS-SMS subscribed by the called party shows that the calling party is set by the called party as a short message source to be filtered, the VAS-SMS processing center sends directly to the short message service center the delivery result notification that the original short message is delivered with success, after returning the reception acknowledgement indication to the short message service center.

9. The method according to claim 2, wherein when the data of VAS-SMS subscribed by the calling party shows that the calling party subscribes for a receipt service, the short message value-added service processing center further instructs in the delivery result notification the short message service center to send the delivery status report of the original short message to the calling party.

10. The method according to claim 2, wherein when the data of VAS-SMS subscribed by the calling party shows that the calling party subscribes for a short message storage service, the VAS-SMS processing center further stores the original short message by categories for the calling party in accordance with the delivery result of the original short message.

11. The method according to claim 6, wherein the VAS-SMS processing center determines whether to generate the value-added service short message associated with the original short message in accordance with the data of VAS-SMS subscribed by the calling and called parties of the original short message, and if the value-added service short message associated with the original short message is to be generated, the VAS-SMS processing center instructs in the receipt acknowledgement indication the short message service center to continue with buffering the original short message; and if the value-added service short message associated with the original short message is not to be generated, the VAS-SMS processing center instructs in the receipt acknowledgement indication the short message service center to deliver the original short message.

12. The method according to claim 11, wherein:
    when the data of VAS-SMS subscribed by the calling party shows that the calling party subscribes for a signature service, the value-added service short message associated with the original short message is to be generated, wherein a signature set by the calling party is added in the value-added service short message;

when the data of VAS-SMS subscribed by the calling party shows that the calling party subscribes for a calling number hiding service, the value-added service short message associated with the original short message is to be generated, wherein a calling number in the value-added service short message is set as being null or modified as specific identification information;

when the data of VAS-SMS subscribed by the called party shows that the called party subscribes for a short message forwarding service, the value-added service short message associated with the original short message is to be generated, where a called number in the value-added service short message is modified as a forwarding-to number set by the called party.

13. The method according to claim 7, wherein:
the VAS-SMS processing center instructs in the receipt acknowledgement indication the short message service center to continue with suspending processing of the original short message; and the VAS-SMS processing center further determines whether to generate the value-added service short message associated with the original short message in accordance with the data of VAS-SMS subscribed by the calling and called parties of the original short message, and if the value-added service short message associated with the original short message is to be generated, the VAS-SMS processing center generates the value-added service short message; and if the value-added service short message associated with the original short message is not to be generated, the VAS-SMS processing center takes the original short message as the associated value-added service short message.

14. The method according to claim 10, wherein when data of VAS-SMS subscribed by the called party shows that the called party subscribes for a short message storage service, the VAS-SMS processing center further stores the original short message by categories for the called party in accordance with the delivery result of the original short message.

15. A VAS-SMS processing center, comprising:
a first unit adapted to receive an original short message forwarded from a short message service center, SMSC, wherein the original short message is forwarded, by the SMSC, and is submitted from a calling party for a called party to the SMSC, wherein:
  the SMSC sets value-added service identifiers to identify new subscribers which has been subscribed to the VAS-SMS;
  the original short message is forwarded to the VAS-SMS processing center after the SMSC has determined, based on value-added service identifiers for subscribers in the SMSC, whether at least one of the calling party or the called party of the original short message is provided with the value-added service identifier;
  if it is determined that the at least one of the calling party or the called party is provided with the value-added service identifier:
a second unit adapted to generate a value-added service short message associated with the original short message in accordance with value-added service subscription data of the calling party or the called party;
a third unit adapted to submit the value-added service short message to the SMSC and to receive a delivery status report returned from the SMSC, which reports a delivery result about whether the value-added service short message is delivered with success; and
a fourth unit adapted to receive the delivery result of the value-added service short message as that of the associated original short message and to send a delivery result notification of the original short message to the SMSC.

16. The short message value-added service processing center according to claim 15, wherein:
the second unit is further adapted to return a reception acknowledgement indication to the SMSC in accordance with the value-added service subscription data of the calling party or the called party.

17. A device for processing value-added service for short message service (VAS-SMS), comprising a value-added service processing center adapted to receive an original short message forwarded from a short message service center (SMSC), wherein the original short message is submitted by a calling party to a called party, and the short message service center:
sets value-added service identifiers to identify a new subscriber which has been subscribed to VAS-SMS in the SMSC,
based on value-added service identifiers for subscribers in the SMSC, determines whether at least one of the calling party or the called party of the original short message is provided with the value-added service identifier;
if it is determined that the at least one of the calling party or the called party is provided with the value-added service identifier:
  the SMSC forwards the original short message to a VAS-SMS processing center;
  the VAS-SMS processing center obtains value-added service subscription data of the calling party or the called party; wherein:
based on the obtained value-added service subscription data, the VAS-SMS generates a value-added service message associated with the original message in accordance with value-added service subscription data of a calling party or a called party of the original message, to submit the value-added service message to the short message service center, to receive a delivery status report returned from the short message service center, to take a delivery result of the value-added service message as that of the associated original message and to send a delivery result notification of the original message to the short message service center.

18. A short message service center (SMSC), wherein the SMSC:
sets by a Short Message Service Center (SMSC), a value-added service identifier to identify a new subscriber which has been subscribed to VAS-SMS, in the SMSC;
forwards an original short message destined to a called party, wherein the original short message is submitted from a calling party to a value-added service processing center after the SMSC determining, based on value-added service identifiers for subscribers in the SMSC, a value-added service identifier is provided for either one of the calling party or the called party of the original short message,
buffers the original message,
receives a value-added service message associated with the original message, wherein the value-added service message is sent from the value-added service processing center, delivers the value-added service message, returns a delivery status report to the value-added service processing center, and receives a delivery result notification of the original message, which is generated by the value-added service processing center in accordance with the delivery status report.

19. At a Short Message Service Center (SMSC), a method for processing value-added service for short message service (VAS-SMS), comprising:

setting a value-added service identifier to identify a new subscriber which has been subscribed to VAS-SMS, in the SMSC;

receiving an original short message submitted by a calling party to a called party;

based on value-added service identifier for subscribers in the SMSC, determining whether at least one of the calling party or the called party of the original short message is provided with the value-added service identifier;

if it is determined that the at least one of the calling party or the called party is provided with the value-added service identifier:

forwarding the original short message to a VAS-SMS processing center;

receiving a value-added service short message associated with the original short message submitted by the VAS-SMS processing center, wherein the value-added service short message is generated by the VAS-SMS processing center based on value-added service subscription data of the calling party or the called party;

delivering the value-added service short message to the called party;

receiving a delivery message response submitted by the called party;

based on the received delivery message response, submitting a delivery status report to the VAS-SMS processing center, which reports a delivery result about whether the value-added service short message is delivered with success; and receiving a delivery result notification of the original short message from the VAS-SMS processing center.

* * * * *